United States Patent
Henley

[11] Patent Number: 5,864,307
[45] Date of Patent: Jan. 26, 1999

[54] AIRCRAFT TERRAIN ADVISORY SYSTEM

[75] Inventor: Anthony John M. Henley, Staplehurst, United Kingdom

[73] Assignee: GEC Marconi Limited, Stanmore, United Kingdom

[21] Appl. No.: 802,138

[22] Filed: Jan. 19, 1997

[30] Foreign Application Priority Data

Feb. 19, 1996 [GB] United Kingdom .................... 9603459
Aug. 5, 1996 [GB] United Kingdom .................... 9616435

[51] Int. Cl.⁶ .................................................. G08B 23/00
[52] U.S. Cl. .................... 340/964; 340/963; 340/995; 340/968; 342/65; 701/301; 701/208
[58] Field of Search ................................. 340/970, 963, 340/964, 969, 961, 988, 995; 364/424.016, 424.012, 424.013, 424.014, 424.018, 454, 461, 449.7, 449.8, 460; 342/65

[56] References Cited

U.S. PATENT DOCUMENTS

| | | | |
|---|---|---|---|
| 4,646,244 | 2/1987 | Bateman et al. | 364/461 |
| 4,924,401 | 5/1990 | Bice et al. | 364/433 |
| 5,381,338 | 1/1995 | Wysocki et al. | 364/449.1 |
| 5,414,631 | 5/1995 | Denoize et al. | 364/461 |
| 5,442,556 | 8/1995 | Boyes et al. | 364/433 |
| 5,448,233 | 9/1995 | Saban et al. | 340/963 |
| 5,488,563 | 1/1996 | Chazelle et al. | 364/461 |

FOREIGN PATENT DOCUMENTS

| | | |
|---|---|---|
| 1062530 | 3/1967 | United Kingdom . |
| 2 097 742 | 11/1982 | United Kingdom . |
| 2 174 665 | 11/1986 | United Kingdom . |
| 2 175 264 | 11/1986 | United Kingdom . |
| 2 266 286 | 10/1993 | United Kingdom . |
| 1 605 407 | 4/1996 | United Kingdom . |
| WO 85/03566 | 8/1985 | WIPO . |

*Primary Examiner*—Jeffery A. Hofsass
*Assistant Examiner*—Benjamin C. Lee
*Attorney, Agent, or Firm*—Kirschstein, et al

[57] ABSTRACT

A terrain advisory system for an aircraft (A) comprises a processor (11) which compares terrain information, accessed from a memory (13) according to data from a navigation system (12), with dynamic flight parameters from a monitor (14) for the aircraft. The processor (11) also generates a trajectory signal and a pull-up signal to indicate, on a display (15), current aircraft trajectory relative to a line constructed from notional pull-up trajectories for the aircraft which avoid a predetermined clearance height without exceeding a predetermined acceleration acting on the aircraft during a pull-up maneuver.

12 Claims, 2 Drawing Sheets

AIRCRAFT TERRAIN ADVISORY SYSTEM

BACKGROUND OF THE INVENTION

This invention relates to an aircraft terrain advisory system, in which terrain information is compared with the dynamic flight parameters for that aircraft to indicate the current aircraft trajectory with respect to clearance heights for a terrain to be avoided by the aircraft without exceeding a predetermined acceleration of the aircraft during a pull up manoeuvre. The invention also relates to a method for indicating the current aircraft trajectory with respect to clearance heights for a terrain.

Consider an eye position above the ground, and the various lines of sight radiating from that position. Some of these lines of sight will intercept the ground or objects projecting from the ground, while others will not. The boundary between the lines of sight which do and do not intercept the ground is known as the visual horizon from that eye position The operation of the aircraft terrain advisory system can be defined analogously. Consider the position of an aircraft above the ground, and consider the possible trajectories emanating from that point. For each of these trajectories it will be either possible or impossible to pull up from that point without exceeding a predetermined acceleration of the aircraft, given the dynamic flight parameters of that aircraft, such that the trajectory avoids hitting the ground. The region defined by trajectories from which pull up can be achieved is the region the current trajectory of the aircraft must remain in to ensure pull up is possible for a given acceleration of the aircraft. In practice the aircraft is required to avoid violating a clearance level above the ground and not just merely the ground.

BRIEF SUMMARY OF THE INVENTION

It is an object of this invention to provide an aircraft terrain advisory system which will enable a pilot to avoid violating a predetermined terrain clearance level without exceeding a predetermined acceleration of the aircraft.

According to a first aspect of the present invention there is provided an aircraft terrain advisory systems comprising a navigation means arranged to generate navigational information in respect of said aircraft.

a monitor means arranged to generate parameter information representing dynamic flight parameters of said aircraft, a memory means storing height information of terrain that might be overflown by said aircraft, and a processor operably arranged
1. to receive said navigational information and said parameter information,
2. to access and receive said height information for a terrain area ahead of said aircraft dependent on said navigational information and to generate future terrain clearance level signals representing predetermined clearance heights above terrain heights within said terrain area which must not be violated when said aircraft overlies said terrain area,
3. to generate sets of pull-up signals representing notional pull-up trajectories that said aircraft can perform without exceeding a maximum predetermined acceleration of said aircraft determined from said parameter information and without violating said predetermined clearance heights determined from said terrain clearance level signals,
4. to generate from said parameter information and said navigational information a trajectory signal representing current trajectory of said aircraft, and
5. to indicate said current trajectory with respect to safe and unsafe regions in which said aircraft can fly without exceeding said maximum predetermined acceleration of said aircraft.

Preferably, a display means may be operably connected to said processor and arranged to receive said sets of pull-up signals and said trajectory signal, said display means may be arranged to display a line corresponding to said sets of pull-up signals, and said display means may also be arranged to display said trajectory signal with respect to said line.

Preferably, said line is constructed from a boundary region between a plurality of possible aircraft pull up trajectories which avoid said predetermined clearance heights and a plurality of possible aircraft pull up trajectories which do not avoid said predetermined clearance heights for said maximum predetermined acceleration of said aircraft The said navigation means may comprise an Inertial Navigation System operably connected to a Terrain Referenced Navigation System and may be arranged to receive corrections from said Terrain Referenced Navigation System or alternatively said navigation means may comprise a Global Positioning System Receiver.

The said processor may be arranged to generate a set of pull-up signals for each of a plurality of maximum predetermined accelerations of said aircraft and said display means may be further arranged to display a line corresponding to each set of pull-up signals. Alternatively said processor may be arranged to generate pull-up signals, corresponding to lines immediately above and immediately below said trajectory signals and said display means may be farther arranged to display each line. As a further alternative, said processor may be arranged to generate pull-up signals corresponding to truncated lines immediately above and immediately below said trajectory signals and said display means may be further arranged to display each truncated line.

Alternatively, an audible means may be operably connected to said processor and arranged to receive said sets of pull-up signals and said trajectory signal, and said audible means may be arranged to generate a plurality of audible signals which correspond to the position of said trajectory signal with respect to said sets of pull-up signals.

According to a second aspect of the present invention there is provided a method of indicating current aircraft trajectory with respect to terrain clearance level, comprising the steps of:

generating navigational information in respect of an aircraft, accessing height information for a terrain area ahead of said aircraft depending on said navigational information and generating future terrain clearance level signals representing predetermined clearance heights above terrain heights within said terrain area which must not be violated when said aircraft overflies said terrain area, generating sets of pull-up signals dependent on flight parameters of said aircraft and said terrain clearance level signals, said sets of pull-up signals representing notional pull-up trajectories that said aircraft can perform without exceeding a maximum predetermined acceleration of said aircraft and without violating said predetermined clearance heights, generating a trajectory signal using said parameter information and said navigational information, said trajectory signal representing current trajectory of said aircraft and indicating said current trajectory with respect to safe and unsafe regions in which said aircraft can fly without exceeding said maximum predetermined acceleration of said aircraft.

Preferably, the method may further comprise displaying a line corresponding to said sets of pull-up signals, and displaying said trajectory signal with respect to said line.

The method may further comprise constructing said line by determining said line as a boundary region between a plurality of possible aircraft pull-up trajectories which avoid said predetermined clearance heights, and a plurality of possible aircraft pull-up trajectories which do not avoid said predetermined clearance heights for a maximum predetermined acceleration of said aircraft.

BRIEF DESCRIPTION OF THE DRAWINGS

The invention is further described, by way of example only, with reference to the accompanying drawings in which.

DETAILED DESCRIPTION

Figure 1:
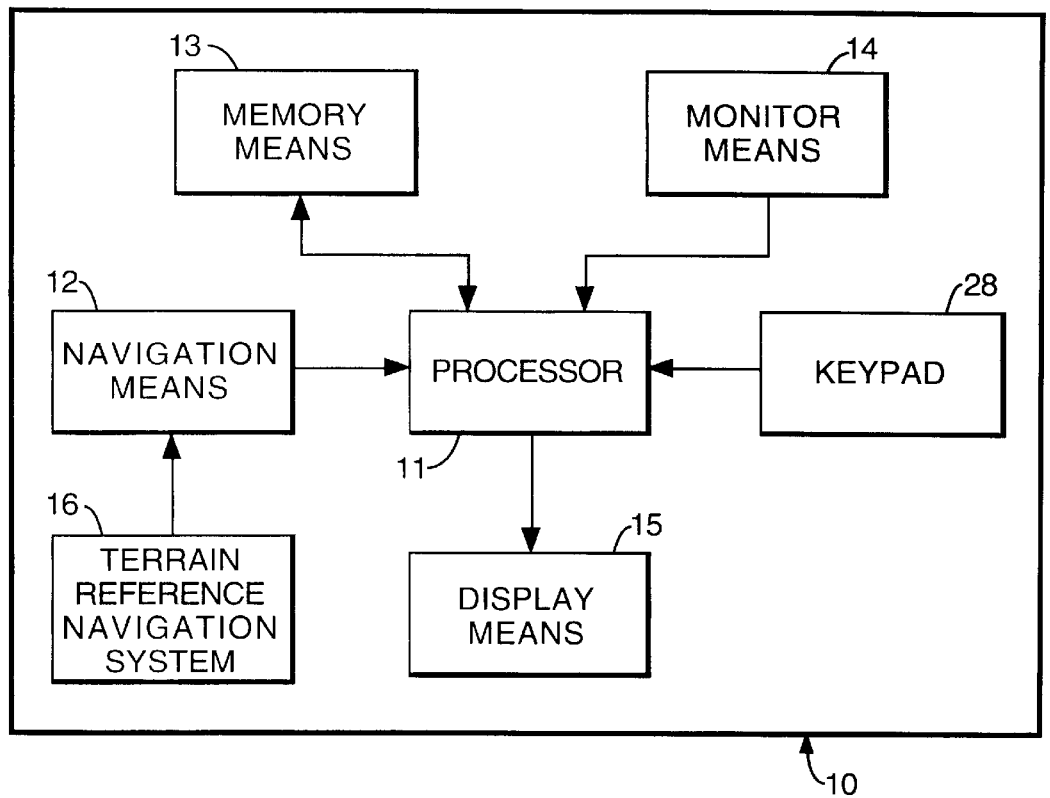
FIG. 1 is a block diagram of the system.

Referring to FIG. 1, an aircraft terrain advisory system 10 carried by an aircraft comprises a processor 11 operably connected to a navigation means 12 and a memory means 13. The navigation means 12 may be an Inertial Navigation System which is operably connected to receive slowly varying corrections from a Terrain Referenced Navigation System 16 to update an estimate of navigation corrections with terrain measurements, or a Global Positioning System Receiver or any other high precision navigation instrument. The memory means 13 is arranged to store height information, in the form of terrain heights, for a terrain area which night be overflown by the aircraft and may be a terrain database or any suitable device for storing height information.

The processor 11 is arranged to receive navigational information, in respect of the aircraft, from the navigational means 12, and to access the memory means 13 and receive the stored height information for a terrain area ahead of the current position of the aircraft according to the received navigational information. The processor 11 is also operably connected to a monitor means 14 which generates parameter information representing dynamic flight parameter of the aircraft.

The processor 11 is arranged to generate a future terrain clearance level signal which corresponds to predetermined clearance heights above the terrain heights, within the terrain area. The clearance heights represent a clearance margin above the terrain heights.

The processor 11 is arranged to compare received parameter information from the monitor means 14 with the terrain clearance level signal and to generate a pull-up signal representing a notional pull-up trajectory that the aircraft can perform without violating the clearance heights and without exceeding a predetermined acceleration of the aircraft. The processor 11 is also arranged to generate a trajectory signal, from the received parameter information and navigational information, which represent the current trajectory of the aircraft.

A display means 15 is arranged to display a line indicating notional pull-up trajectories using the pull-up signal and to display the trajectory signal as the current trajectory of the aircraft with respect to the line on the display means 15. Hence, a pilot or operator of the aircraft can determine, by observation of the current trajectory relative to the line, if evasive action is necessary for the aircraft to avoid the terrain area ahead of the aircraft without passing below the predetermined clearance heights and without exceeding the predetermined acceleration of the aircraft.

Figure 2:
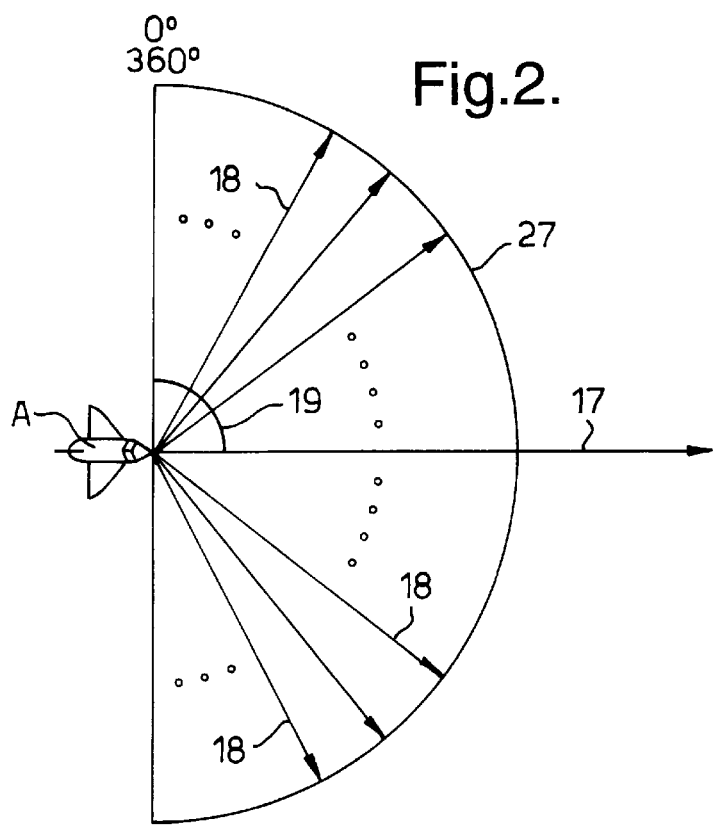
FIG. 2 illustrates a plurality of possible heading trajectories in a terrain area ahead of an aircraft in the azimuth plane.
Figure 3:
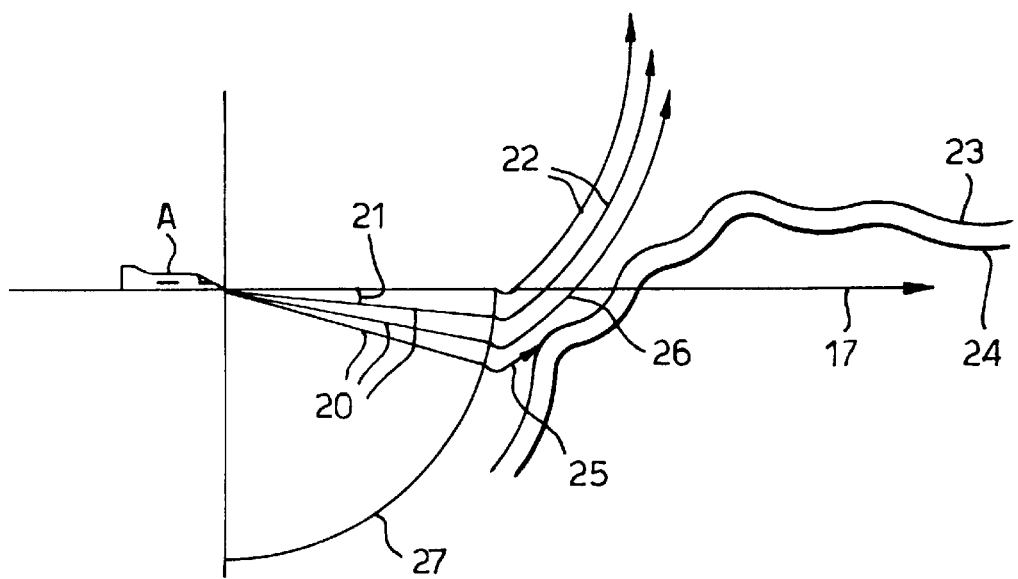
FIG. 3 illustrates a plurality of possible dive/climb trajectories in a terrain area ahead of an aircraft in the elevation plane compared with a terrain and a clearance height.

The pull-up signal for the displayed line above which the displayed current trajectory is to be maintained is determined in the following manner. Referring to FIG. 2, an aircraft A following a current trajectory 17 across a terrain area ahead of the aircraft has a plurality of possible heading trajectories 18 in the azimuth plane corresponding with the heading angle 19 of the aircraft A. FIG. 3, shows that for each possible heading trajectory in the terrain area ahead of the aircraft there are also a plurality of possible dive/climb trajectories 20 in the elevation plane for variations of only the dive/climb angle 21.

Figure 4:
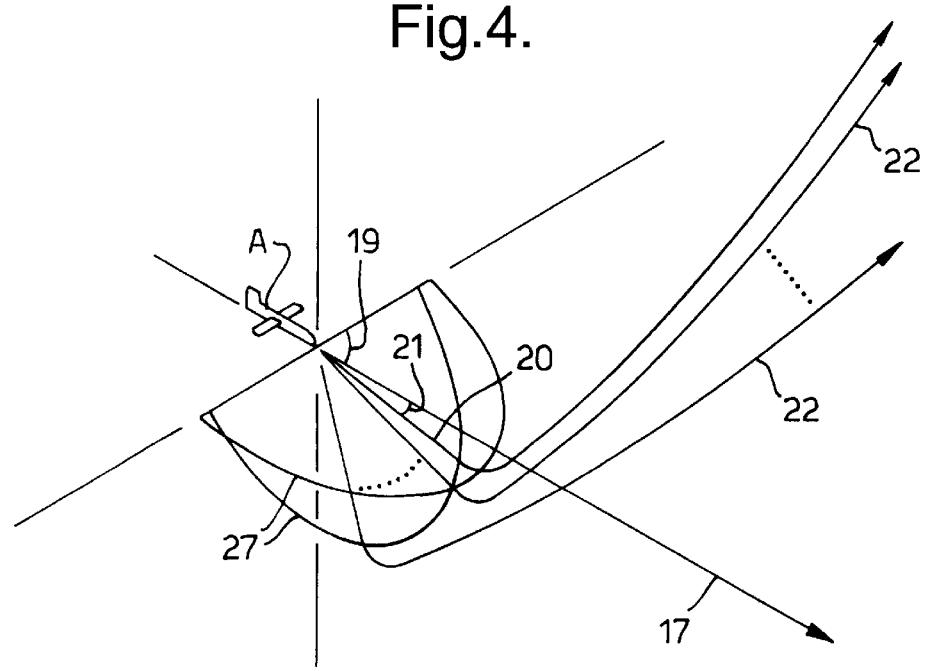
FIG. 4 illustrates a plurality of possible pull-up trajectories for an aircraft for a single set of possible trajectories for a given heading across the terrain area.

Therefore there are a plurality of possible trajectories radiating from the aircraft A which can be divided into sets of dive/climb trajectories 20 each set having a similar heading angle 19, as illustrated in FIG. 4.

Referring to FIG. 3, for each set of dive/climb trajectories, a set of notional pull-up trajectories 22 can be determined using the dynamic flight parameters of the aircraft such that a predetermined acceleration acting on the aircraft A is not exceeded and such that the notional pull-up trajectories 22 avoid violating a clearance level 23 above a terrain height 24.

Any point on the line can be determined by considering a possible heading trajectory and finding a boundary region between dive/climb trajectories 20 where the aircraft A would, or would not, avoid violating the clearance heights 23 given the dynamic flight parameters of the aircraft A and without exceeding a predetermined acceleration of the aircraft A.

More particularly the point can be found by determining, for an initial pair of dive/climb trajectories 20, the fist trajectory set at the minimum dive/climb angle and the second trajectory is set at the maximum dive/climb angle, if the point lies somewhere between the initial pair of dive/climb trajectories 20. If the point is determined to exist between the initial pair of dive/climb trajectories 20 then a central value is considered to determine which half the point lies in. This binary search is continued until the point has been determined to the required resolution. This is the boundary region. This is illustrated by the pair of pull up trajectories 25 and 26, from which it will be seen that the first trajectory 25 does not avoid violating the clearance heights 23 but the second trajectory 26 does.

A point can be determined for each possible heading trajectory 18 so as to construct a line indicating a horizon of the safe and unsafe regions in which the aircraft A can fly without necessitating a manoeuvre which will infringe either the predetermined clearance height or the predetermined acceleration of the aircraft.

By displaying the current trajectory 17 with respect to this line of safe and unsafe regions, the pilot can observe if the aircraft A is flying within a safe or unsafe region and adjust the position of the current trajectory 17 of the aircraft A with respect to the line accordingly.

FIG. 4 illustrates the pull up trajectories 22 for a plurality of dive/climb angles 19 for a given heading across the terrain area.

A time delay 27 to allow for the reaction time of the pilot or operator and the aircraft A is included in the determination of the boundary region for each heading trajectory and hence built into the line.

The pilot can also enter parameters such as the clearance height 23 and the acceleration of the aircraft which should not be exceeded via a keypad 28 as indicated in FIG. 1 or the parameters may be stored in a suitable memory device.

The line can also be determined for a range of accelerations of the aircraft, so that a ladder of lines can be displayed on the display means 15 together with the current trajectory 17 of the aircraft so that the pilot can observe the pull up acceleration required to safely pull up on any heading across the line.

If processing power is limited, the ladder can be restricted to a small portion displaying only the lines immediately above and immediately below the current trajectory 17 on the display means 15. Alternatively, only a section of the lines immediately above and immediately below the current trajectory 17 can be displayed on the display means 15, for example in the form of an icon. The current trajectory 17 need not be displayed in this instance as it will lie between the lines above and below the current trajectory and can be followed with the change from one vertical acceleration level to another on the ladder.

The display may be any suitable display or instrument that is capable of indicating to a pilot or operator the current trajectory of the aircraft with respect to a line, for instance a head up display, head down display, visor projected display or retina projected display.

The display may also be remote from the aircraft for use by an operator.

In an alternative embodiment an audible means may be operably connected to the processor to receive the pull-up signal and the trajectory signal and arranged to generate a series of audible signals corresponding to the position of the trajectory signal with respect to the pull-up signal.

I claim:

1. An aircraft terrain advisory system, comprising
   a navigation means arranged to generate navigational information in respect of an aircraft,
   a monitor means arranged to generate parameter information representing dynamic flight parameters of said aircraft,
   a memory means storing height information of terrain that might be overflown by said aircraft, and
   a processor oeprably arranged
      a) to receive said navigational information and said parameter information,
      b) to access and receive said height information for a terrain area ahead of said aircraft dependent on said navigational information and to generate future terrain clearance level signals representing predetermined clearance heights above terrain heights within said terrain area which must not be violated when said aircraft overflies said terrain area,
      c) to generate sets of pull-up signals representing notional pull-up trajectories that said aircraft can perform without exceeding a maximum predetermined acceleration of said aircraft determined from said parameter information and without violating said predetermined clearance heights determined from said terrain clearance level signals,
      d) to generate from said parameter information and said navigational information a trajectory signal representing current trajectory of said aircraft, and
      e) to indicate said current trajectory with respect to safe and unsafe regions established by said pull-up signals in which said aircraft can fly without exceeding said maximum predetermined acceleration of said aircraft.

2. An aircraft terrain advisory system, as in claim 1, wherein said navigation means comprises an Inertial Navigation System operably connected to a Terrain Referenced Navigation System and arranged to receive corrections from said Terrain Referenced Navigation System.

3. An aircraft terrain advisory system, as in claim 1, wherein said navigation means comprises a Global Positioning System Receiver.

4. An aircraft terrain advisory system, as in claim 1, wherein an audible means is operably connected to said processor and arranged to receive said sets of pull-up signals and said trajectory signal, and said audible means is arranged to generate a plurality of audible signals which correspond to the position of said trajectory signal with respect to said sets of pull-up signals.

5. An aircraft terrain advisory system, as in claim 1, wherein a display means is operably connected to said processor and arranged to receive said sets of pull-up signals and said trajectory signal,
   said display means arranged to display a line corresponding to said sets of pull-up signals,
   and said display means also arranged to display said trajectory signal with respect to said line.

6. An aircraft terrain advisory system, as in claim 5, wherein said line is constructed from a boundary region between a plurality of possible aircraft pull up trajectories which avoid said predetermined clearance heights and a plurality of possible aircraft pull up trajectories which do not avoid said predetermined clearance heights for said maximum predetermined acceleration of said aircraft.

7. An aircraft terrain advisory system, as in claim 5, wherein said processor is arranged to generate a set of pull-up signals for each of a plurality of maximum predetermined accelerations of said aircraft and said display means is further arranged to display a line corresponding to each set of pull-up signals.

8. An aircraft terrain advisory system, as in claim 5, wherein said processor is arranged to generate pull-up signals, corresponding to lines immediately above and immediately below said trajectory signals and said display means is further arranged to display each line.

9. An aircraft terrain advisory system, as in claim 5, wherein said processor is arranged to generate pull-up signals corresponding to truncated lines immediately above and immediately below said trajectory signals and said display means is further arranged to display each truncated line.

10. A method of indicating current aircraft trajectory with respect to terrain clearance levels, comprising the steps of:
   generating navigational information in respect of an aircraft,
   accessing height information for a terrain area ahead of said aircraft depending on said navigational information and generating future terrain clearance level signals representing predetermined clearance heights above terrain heights within said terrain area which must not be violated when said aircraft overflies said terrain area, generating sets of pull-up signals dependent on flight parameters of said aircraft and said terrain clearance level signals, said sets of pull-up signals representing notional pull-up trajectories that said aircraft can perform without exceeding a maximum predetermined acceleration of said aircraft and without violating said predetermined clearance heights, generating a trajectory signal using said parameter information and said navigational information, said trajectory signal representing current trajectory of said aircraft, and indicating said current trajectory with respect to safe and unsafe regions established by said pull-up signals in which said aircraft can fly without exceeding said maximum predetermined acceleration of said aircraft.

11. A method, as in claim 10, further comprising displaying a line corresponding to said sets of pull-up signals, and displaying said trajectory signal with respect to said line.

12. A method, as in claim 11, further comprising constructing said line by determining said line as a boundary region between a plurality of possible aircraft pull-up trajectories which avoid said predetermined clearance heights, and a plurality of possible aircraft pull-up trajectories which do not avoid said predetermined clearance heights for a maximum predetermined acceleration of said aircraft.

* * * * *